US011836808B2

(12) United States Patent
Sawyer

(10) Patent No.: US 11,836,808 B2
(45) Date of Patent: Dec. 5, 2023

(54) SYSTEM AND METHOD OF TRACKING SALES TAX

(71) Applicant: Jenjer Monique Sawyer, Jacksonville, FL (US)

(72) Inventor: Jenjer Monique Sawyer, Jacksonville, FL (US)

( * ) Notice: Subject to any disclaimer, the term of this patent is extended or adjusted under 35 U.S.C. 154(b) by 0 days.

(21) Appl. No.: 16/946,525

(22) Filed: Jun. 25, 2020

(65) Prior Publication Data

US 2021/0035234 A1 Feb. 4, 2021

Related U.S. Application Data

(60) Provisional application No. 62/880,878, filed on Jul. 31, 2019.

(51) Int. Cl.
| | |
|---|---|
| *G06Q 40/10* | (2023.01) |
| *G06Q 40/02* | (2023.01) |
| *G06Q 20/34* | (2012.01) |
| *G06Q 40/12* | (2023.01) |
| *G06Q 10/10* | (2023.01) |
| *G06Q 30/04* | (2012.01) |
| *G06F 16/51* | (2019.01) |
| *H04L 67/50* | (2022.01) |

(52) U.S. Cl.
CPC .............. *G06Q 40/10* (2013.01); *G06F 16/51* (2019.01); *G06Q 10/10* (2013.01); *G06Q 20/3567* (2013.01); *G06Q 40/02* (2013.01); *G06Q 40/12* (2013.12); *H04L 67/535* (2022.05); *G06Q 30/04* (2013.01)

(58) Field of Classification Search
None
See application file for complete search history.

(56) References Cited

U.S. PATENT DOCUMENTS

| | | | |
|---|---|---|---|
| 6,003,016 A | 12/1999 | Hagemier | |
| 6,078,899 A | 6/2000 | Francisco et al. | |
| 6,546,373 B1 | 4/2003 | Cerra | |
| 7,747,484 B2 | 6/2010 | Stanley et al. | |
| 7,860,746 B1* | 12/2010 | Fitch | G06Q 40/123 705/30 |
| 8,306,881 B2 | 11/2012 | Von Drehnen et al. | |
| 8,635,125 B2 | 1/2014 | Baer et al. | |
| 8,719,126 B2 | 5/2014 | Hall et al. | |
| 10,169,829 B2 | 1/2019 | Fox et al. | |
| 10,235,721 B1 | 3/2019 | Cabrera et al. | |
| 2005/0096989 A1 | 5/2005 | Ostlund | |
| 2005/0261967 A1 | 11/2005 | Barry et al. | |
| 2007/0005509 A1 | 1/2007 | Spiller et al. | |
| 2007/0055571 A1* | 3/2007 | Fox | G06Q 20/207 705/19 |
| 2011/0016043 A1 | 1/2011 | Dornseif | |
| 2011/0246318 A1 | 10/2011 | Coulter et al. | |
| 2013/0024282 A1* | 1/2013 | Kansal | G06Q 30/01 707/755 |
| 2015/0242832 A1 | 8/2015 | Corritori et al. | |
| 2015/0248657 A1 | 9/2015 | Loock et al. | |
| 2015/0356539 A1* | 12/2015 | McNeel | G06Q 20/3224 705/19 |

(Continued)

*Primary Examiner* — Scott A Zare

(57) ABSTRACT

A system and method of tracking sales tax. The present invention separates and logs each sales tax for each purchase, which eliminates the need for keeping physical receipts on a yearly basis and having to tally sales tax when preparing tax returns.

5 Claims, 9 Drawing Sheets

(56) References Cited

U.S. PATENT DOCUMENTS

2016/0307034 A1* 10/2016 Goyal .................... G06Q 50/12
2018/0150913 A1   5/2018 Wang et al.
2021/0004880 A1*  1/2021 Benkreira ............ G06Q 20/108

* cited by examiner

SYSTEM AND METHOD OF TRACKING SALES TAX

CROSS-REFERENCE TO RELATED APPLICATION

This application claims the benefit of priority of U.S. provisional application No. 62/880,878 filed 31 Jul. 2019, the contents of which are herein incorporated by reference.

BACKGROUND OF THE INVENTION

The present invention relates to tracking sales tax and, more particularly, to a system and method of tracking sales tax using a software application through a computing device, such as a smart device.

Currently, to track sales tax, one must keep their receipts through the year. During tax season, the user must then tally sales tax and enter the total to their tax forms. The process is cumbersome, time consuming, makes it too easy to misplace and lose receipts, and introduces human error through this inherently manual process.

As can be seen, there is a need for a system and method of tracking sales tax using an application on a smart device that saves both time and receipt paper, yet providing access to the underlying data, while automatically calculating sales taxes without manual assistance. The application is adapted to track the user's sales with a mere swipe. There would be no need to hold the receipts physically anymore. The data automatically transfers to the application. A report could be generated totaling and itemizing all sales tax, therefore eliminating manual calculations by tax preparers.

SUMMARY OF THE INVENTION

In one aspect of the present invention, a method of tracking sales tax associated with one or more financial accounts includes the following: providing one or more payment cards associated with each financial account, wherein each payment card is operatively associated with one or more financial accounts to effectuate at least one electronic transfer therebetween; registering each payment card with a systemic software; the systemic software adapted to abstract transactional data from each electronic transfer, wherein the transactional data includes an electronic sales tax portion, wherein the software application retrievably stores each electronic sales tax portion in a database, and wherein the software application is configured to retrieve one or more reports of each electronic sales tax portion as a function of time, wherein each report is organizable in a daily report, weekly, a monthly report, or a yearly report, wherein the transactional data further includes a purchase price associated with a merchant name and a total purchase price, wherein the software application retrievably stores each total purchase price in the database, and wherein the software application is configured to retrieve one or more reports of each electronic sales tax portion as a function of time.

In another aspect of the present invention, the method of tracking sales tax associated with one or more financial accounts includes the following: providing a computing device loaded with the software application, wherein the computing device has an operatively associated image capture device; and adapting the software application so that a captured image of a receipt by the image capture device enables the software application to retrievably stores a receipt sales tax portion of each receipt in the database with each electronic sales tax portion.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a system and method of tracking sales tax. The present invention separates and logs each sales tax for each purchase, which eliminates the need for keeping physical receipts on a yearly basis and having to tally sales tax when preparing tax returns.

The present invention may include an application loaded on a smart device, such as a smart phone or tablet. When making a purchase, a user may simply swipe or enter the sales tax manually into the application. Using the present invention, there is no longer any need to hold physical receipts anymore. The data is manually entered or automatically transfers to the application by way of utilizing a payment card a financial and a report is generated totaling and itemizing all sales tax, therefore eliminating manual calculations by tax preparers.

Figure 1:
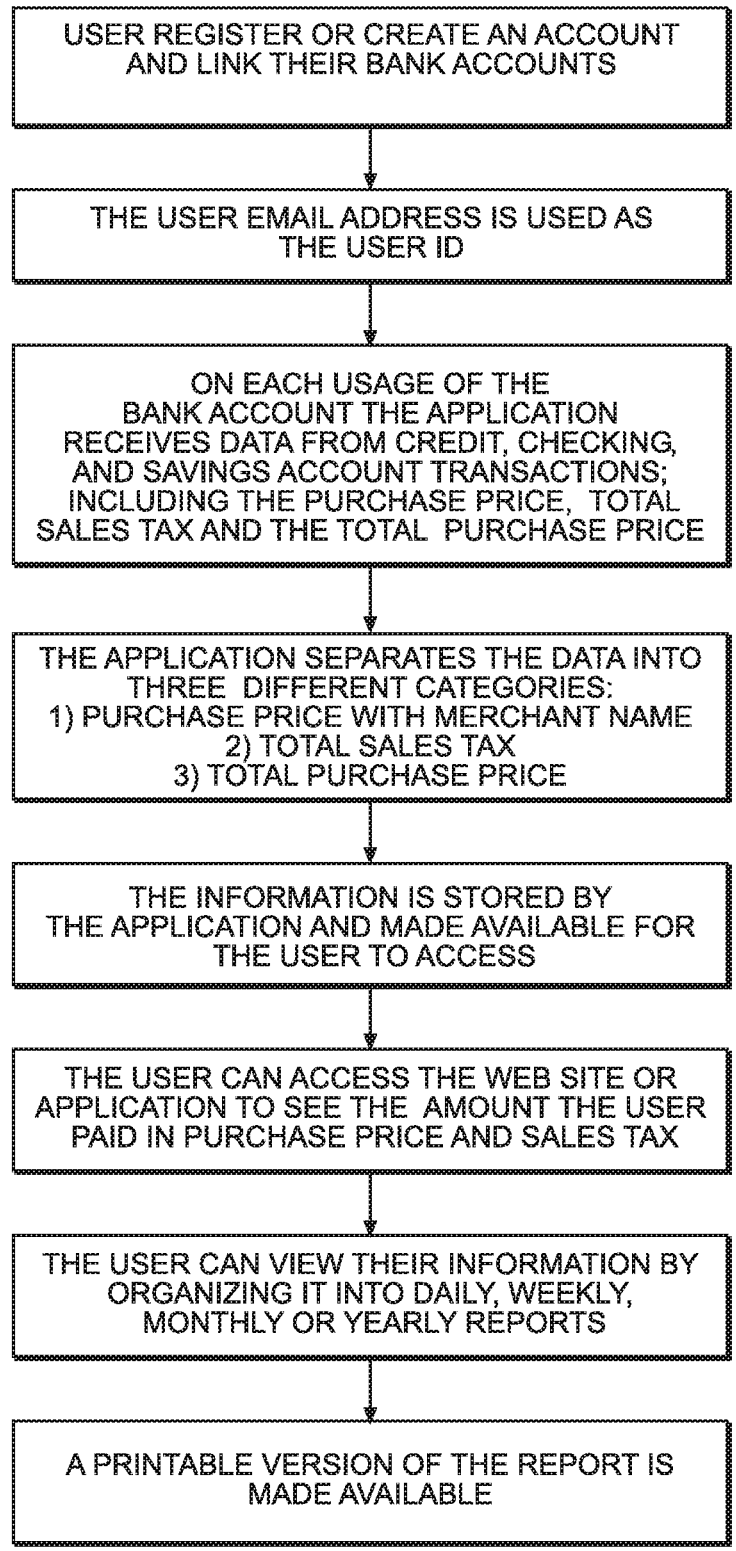
FIG. 1 is a flowchart of an exemplary embodiment of the present invention—the present invention may prompt a user to register or create an account and link their financial accounts thereto, wherein the user email address may be used as the user ID, wherein on each usage of the financial account the application may receive data from swiped payment cards (such as a credit card associated with one or more financial account, wherein the payment card enables an electronic transfer of funds from said financial account), including the purchase price, total sales tax and the total purchase price. The application may be adapted to separate data into three different categories: (1) purchase price with merchant name; (2) total sales tax; and (3) total purchase price; the information is stored by the application and made available for the user to access so that the user can access the web or application to see/track the amount the user paid in purchase price and sales tax; the user can view their information by organizing it into daily, weekly, monthly or yearly reports; and a printable version of the report is made available.
Figure 2C:
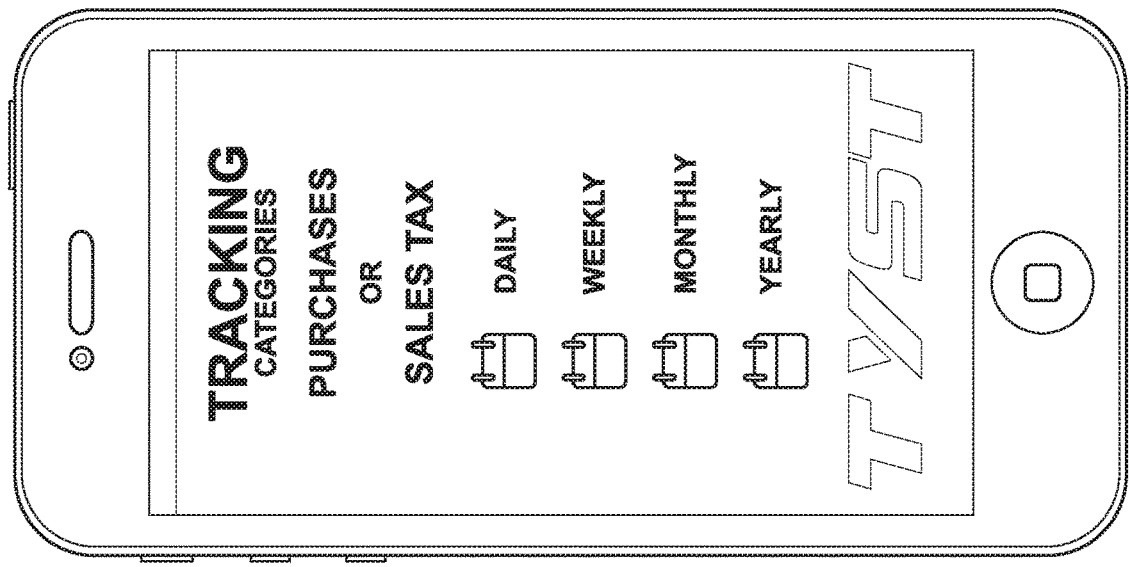
FIG. 2C is a schematic view of an exemplary embodiment of the present invention, illustrating a tracking selection screen modality.
Figure 2B:
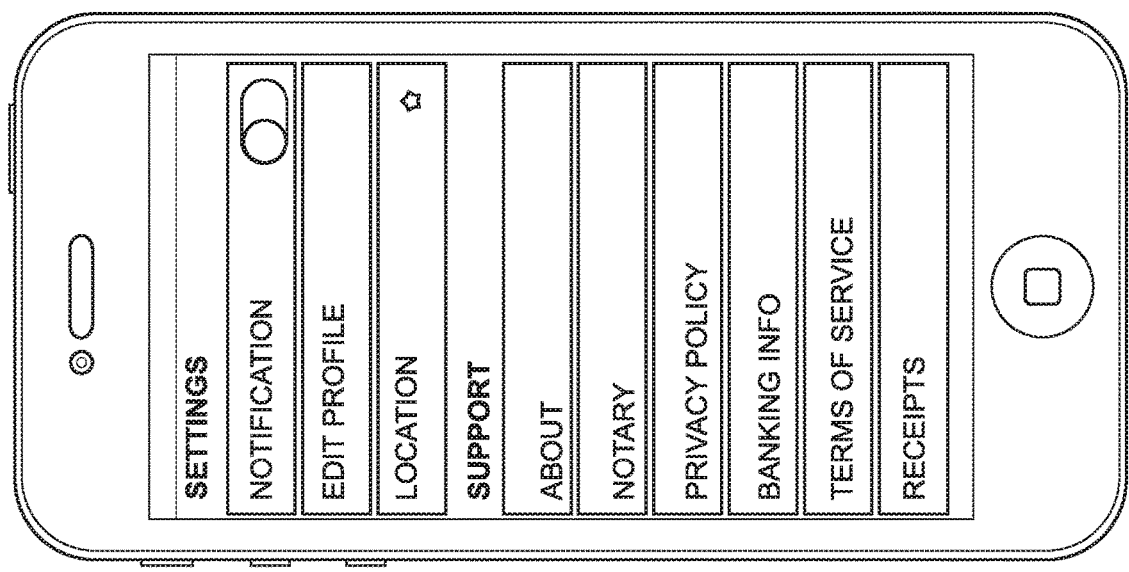
FIG. 2B is a schematic view of an exemplary embodiment of the present invention, illustrating an options screen modality.
Figure 2A:
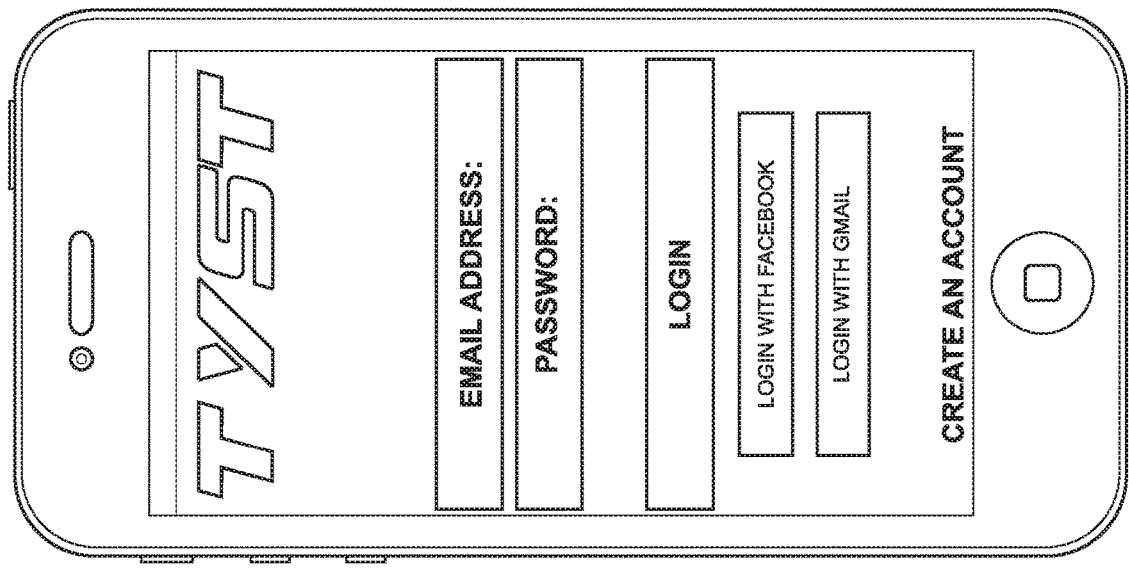
FIG. 2A is a schematic view of an exemplary embodiment of the present invention illustrating, a sign-in modality.
Figure 3:
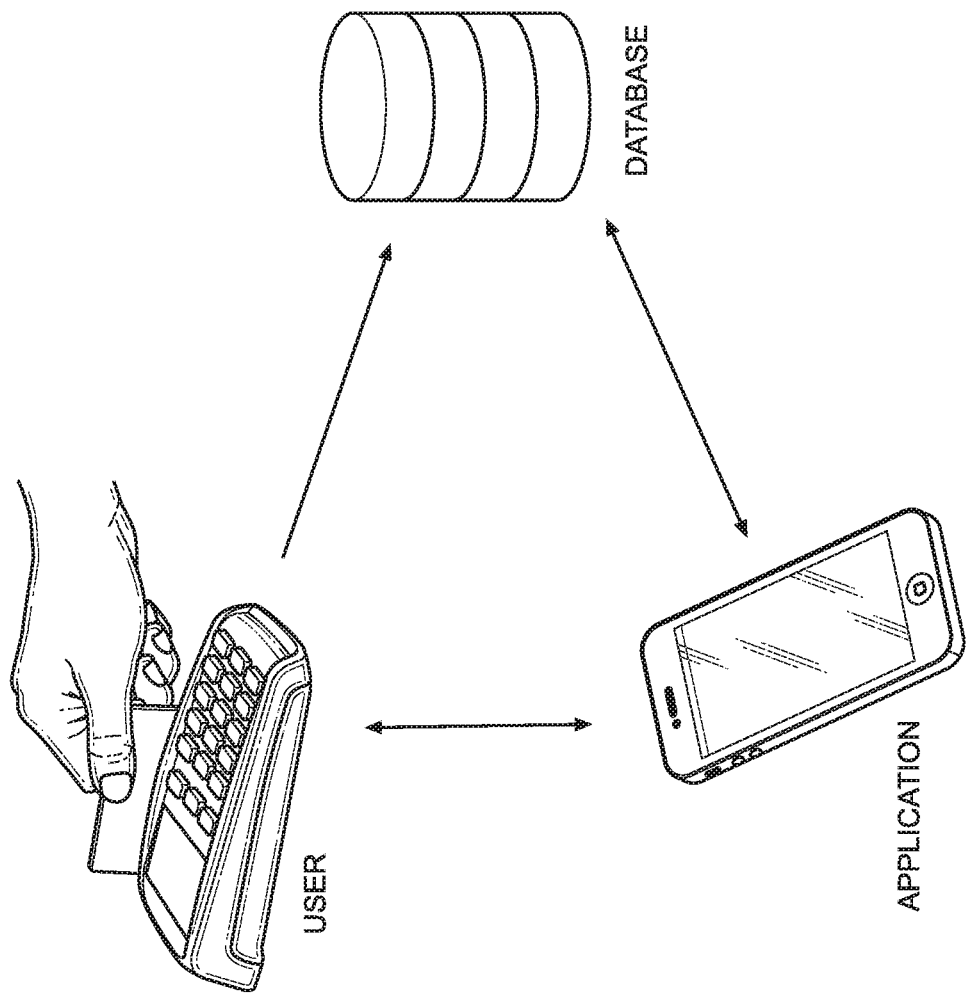
FIG. 3 is a diagrammatic view of an exemplary embodiment of the present invention, illustrating an integration of the different systemic components.
Figure 4A:
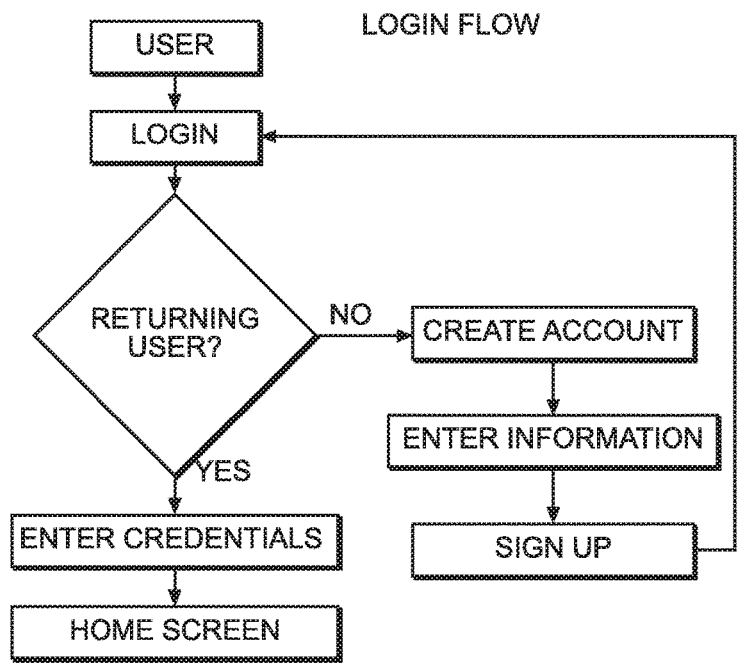
FIG. 4A is a flowchart of an exemplary embodiment of the present invention, representing a login process.
Figure 4B:
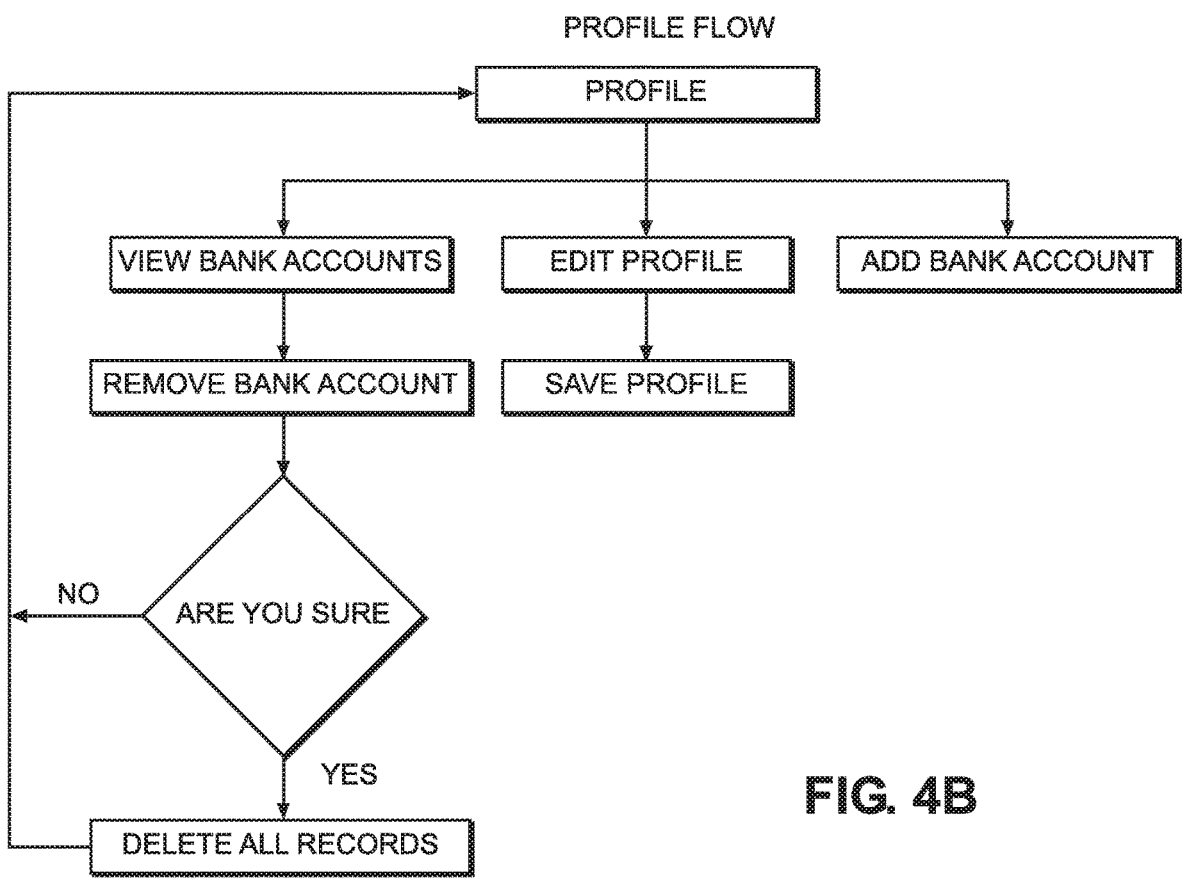
FIG. 4B is a flowchart of an exemplary embodiment of the present invention, representing a profile editing and creation flow process.
Figure 4C:
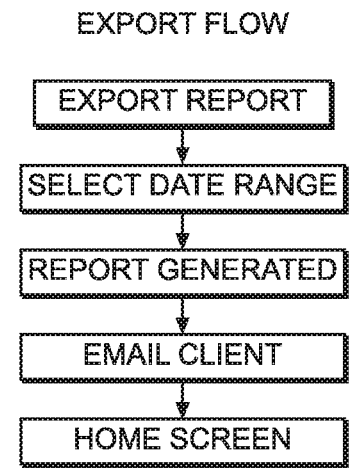
FIG. 4C is a flowchart of an exemplary embodiment of the present invention, representing an exporting flow process.
Figure 4D:
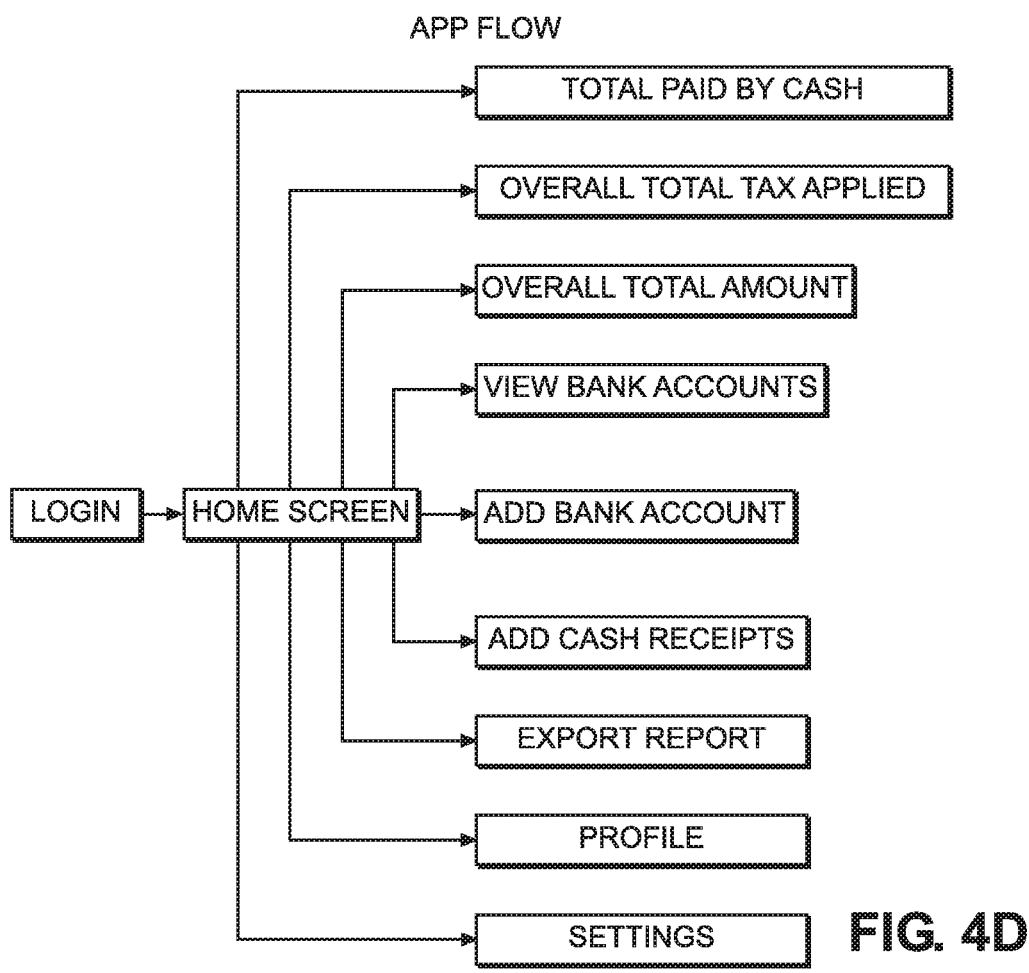
FIG. 4D is a flowchart of an exemplary embodiment of the present invention, representing an application flow process.
Figure 4E:
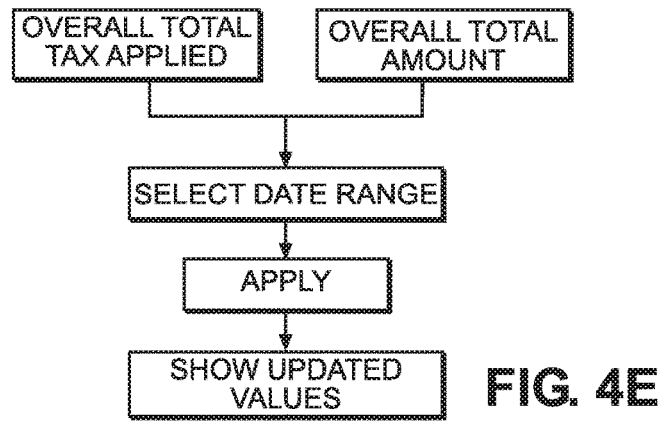
FIG. 4E is a flowchart of an exemplary embodiment of the present invention, representing an additional tax-tip flow process.
Figure 4F:
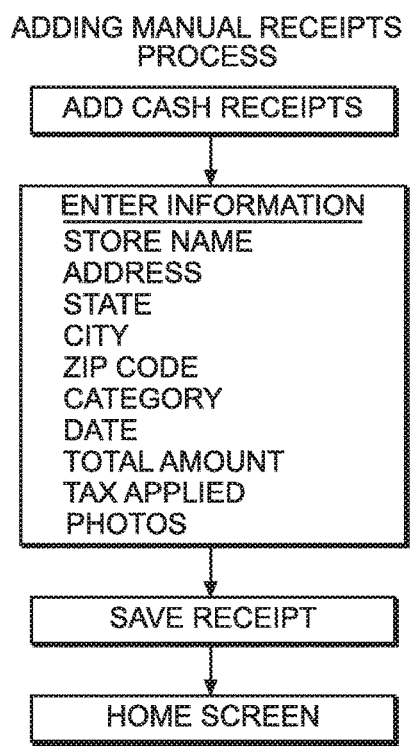
FIG. 4F is a flowchart of an exemplary embodiment of the present invention, representing an additional manual receipts flow process.
Figure 4G:
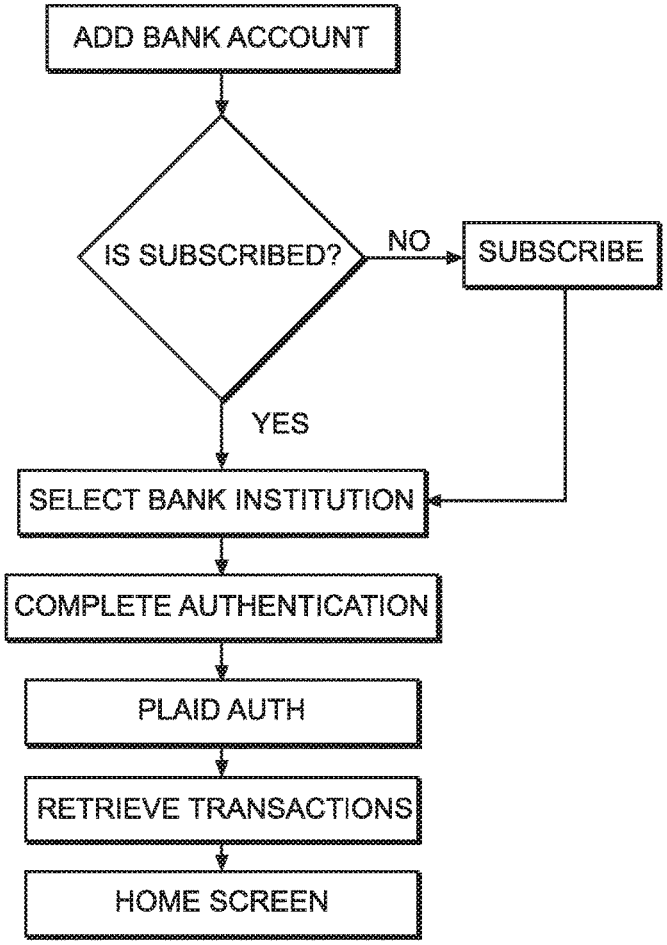
FIG. 4G is a flowchart of an exemplary embodiment of the present invention, representing an additional bank account flow process.
Figure 4H:
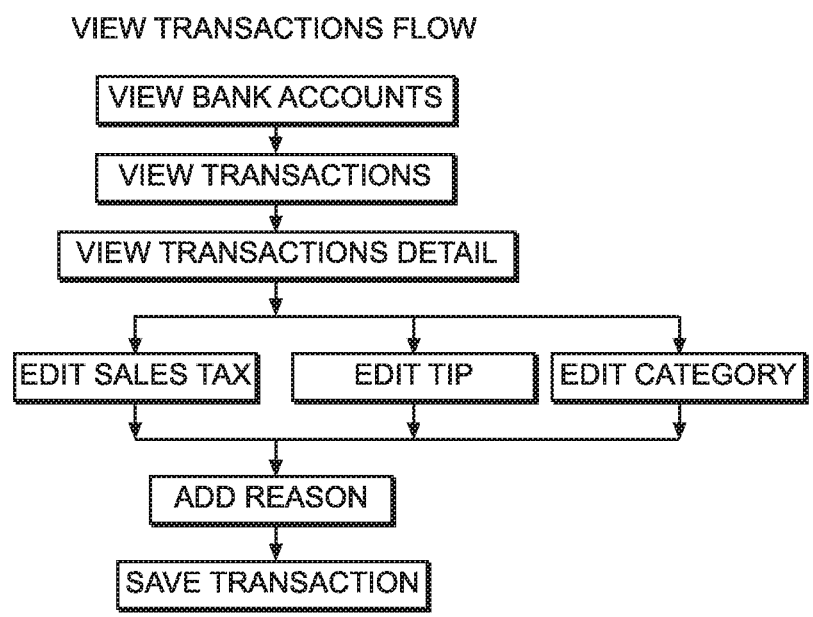
FIG. 4H is a flowchart of an exemplary embodiment of the present invention, representing a view transaction flow process.
Figure 5:
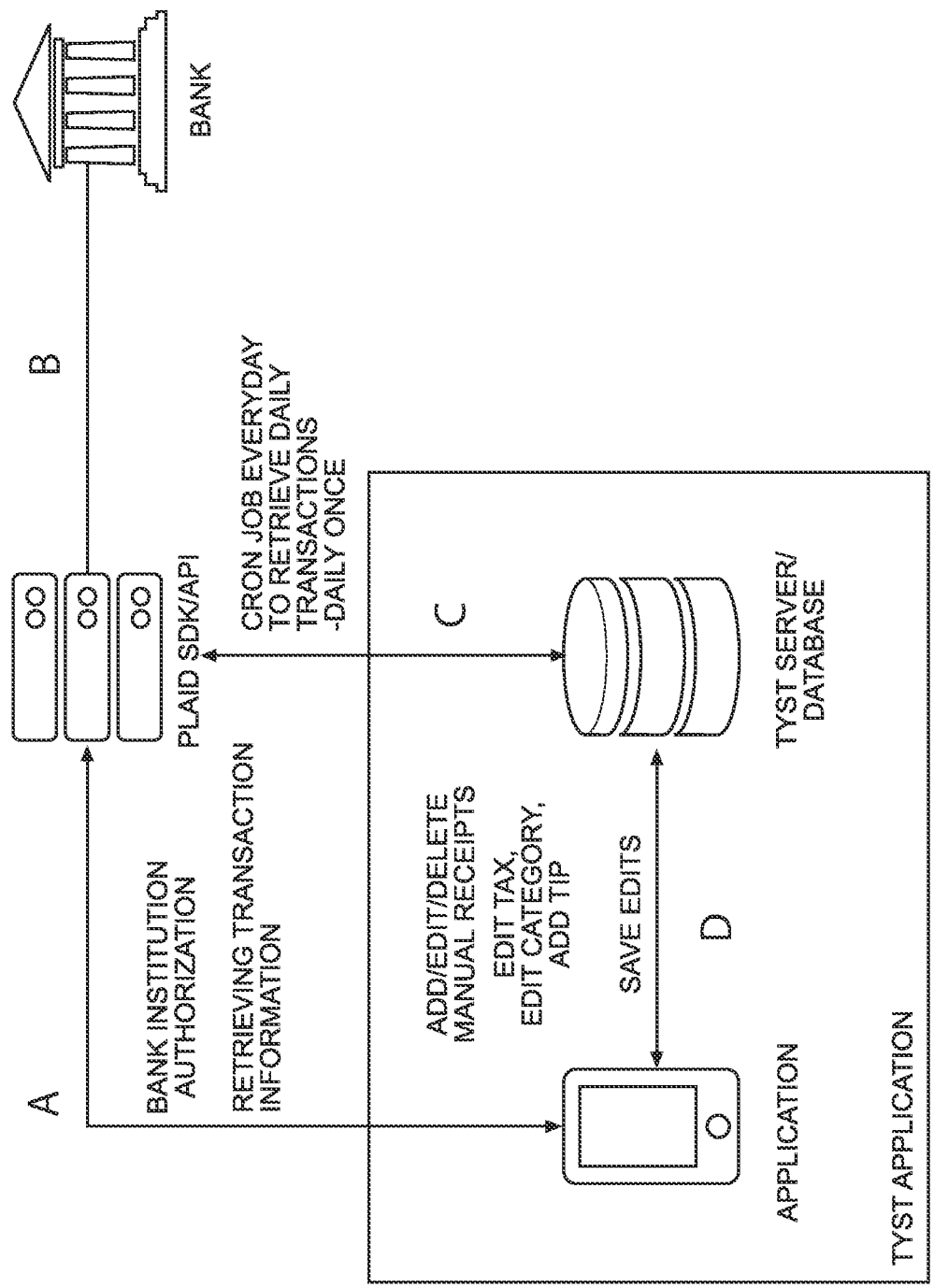
FIG. 5 is a schematic view of an exemplary embodiment of the present invention, wherein the communication path A between the software application and a third-party API, including but not limited to PLAID™ (a financial services company offering a data-transferring platform enables applications to connect with users' bank accounts) enables registration with the API and one or more corresponding financial institutions (banks), wherein the API authorizes the bank/financial institution to export periodic (e.g., daily) transaction logs, for all registered/authorized payment cards/instruments, through the API to the software application and an operatively associated server/database (via communication paths B→A and B→C); in the database the periodic transaction report is retrievably saved for edits. The application retrievably stores manually added receipts (e.g., captured images of physical or cash receipts) in the database by way of communication path D.
Figure 6:
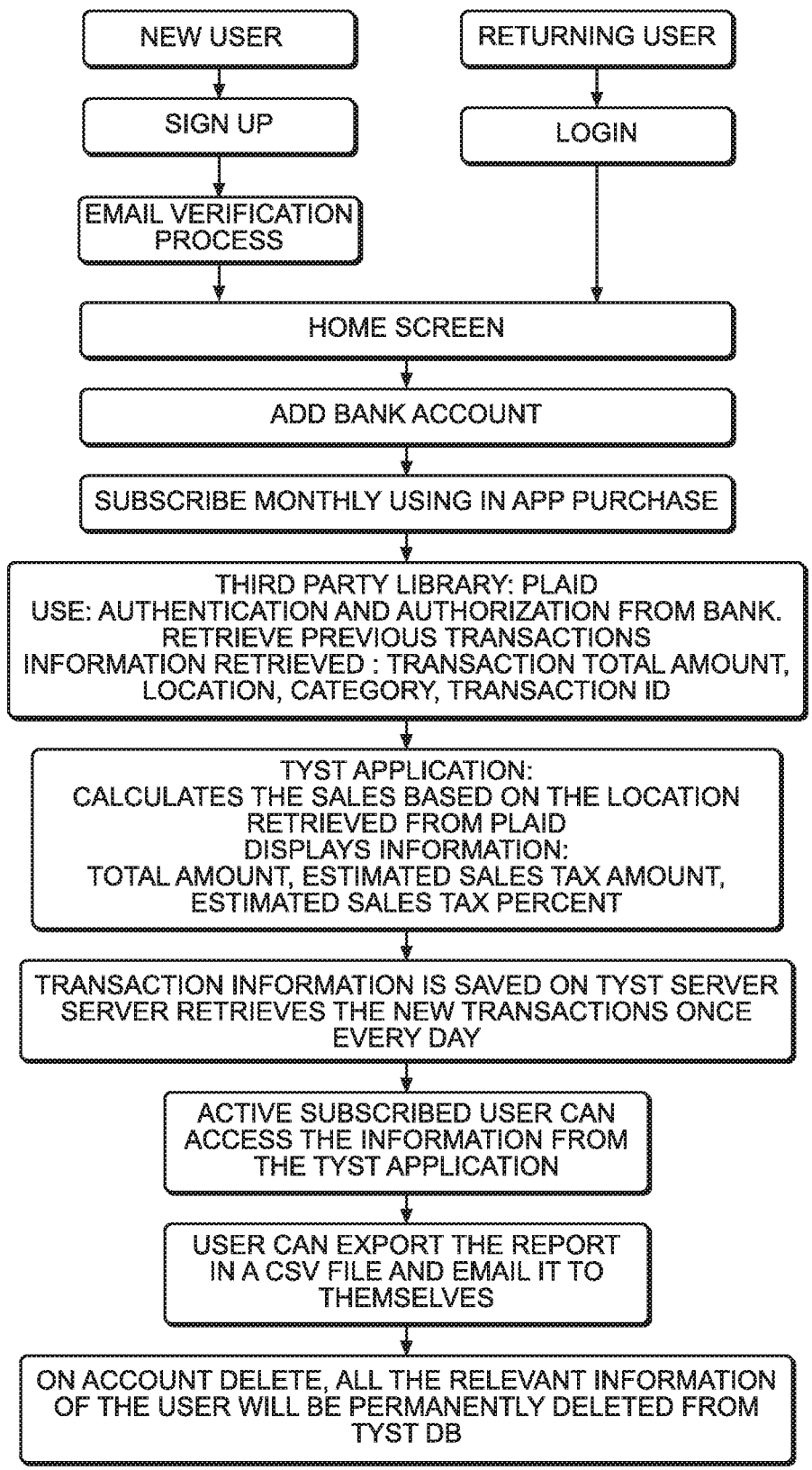
FIG. 6 is a flowchart/block diagram of an exemplary embodiment of the present invention, wherein in one block of the block diagram illustrate that the software application receives the daily or periodic transaction log of the electronic transactions from the bank/financial institution and extracts the sales tax portion therefrom for each transaction, and then calculates the sales tax portion based on the location of the transaction. The location of the transaction is provided in the electronic sales transaction sent by the bank/financial institution.

Referring now to FIGS. 1 through 6, the present invention may include a system and method of tracking sales tax, the system adapted so that when a user swipes a credit, debit card or the user interface of a computing device at a merchant Point of Sale (POS) terminal, the data is transferred to the application. Alternatively, a user may take a picture or capture an image of the receipt, and the application may recognize and log the sales tax from the purchase. A user may also manually enter the amount of sales tax into the application. The software application is adapted to operatively associate with a camera, video recording or other optical input devices of a computing device (e.g., smart phone) in such a way that enables users of the computing device loaded with the systemic software application to upload physical receipts and save them to the application.

In certain embodiments, a user may first register all their credit/debit cards. If the user does not register their credit/debit cards, the user may snap a picture or manually enter the sales tax. If the user registers their cards, the user may simply swipe their cards when purchasing an item, the card being registered previously with the software application, has the financial/transaction data (electronic receipt) that is transmitted to the financial account abstracting into the application for further processing. As mentioned above, the application provides an option to scan in physical receipts.

The system works by assigning values to each category and as the data comes in, apply the logic of addition from the last item enter and track each line item. The user can view and/or download a report of all the data.

The smart device of the present invention includes a computing system. The computing system of the present invention may include at least the processor and the memory. The computing system may execute on any suitable operating system such as IBM's zSeries/Operating System (z/OS), MS-DOS, PC-DOS, MAC-iOS, WINDOWS, UNIX, OpenVMS, ANDROID, an operating system based on LINUX, or any other appropriate operating system, including future operating systems.

In particular embodiments, the computing system includes a processor, memory, a user interface, and a communication interface. In particular embodiments, the processor includes hardware for executing instructions, such as those making up a computer program. The memory includes main memory for storing instructions such as computer program(s) for the processor to execute, or data for processor to operate on. The memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for user communication with the computing system. As an example and not by way of limitation, the user interface may include a keyboard, keypad, microphone, monitor, mouse, printer, scanner, speaker, still camera, stylus, tablet, touchscreen, trackball, video camera, another user interface or a combination of two or more of these.

The communication interface includes hardware, software, or both providing one or more interfaces for communication (e.g., packet-based communication) between the computing system and one or more other computing system or one or more networks. As an example, and not by way of limitation, communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computing system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing system may include any suitable communication interface for any of these networks, where appropriate.

It should be understood, of course, that the foregoing relates to exemplary embodiments of the invention and that modifications may be made without departing from the spirit and scope of the invention as set forth in the following claims.

What is claimed is:

1. A computer-implemented method of tracking sales tax associated with one or more financial accounts in a computer system loaded with systemic software and the computing system having an operatively associated image capture device, the method comprising:

registering, by way of a processor of the computing system, with an application programming interface (API) for authorizing exportation of a periodic transaction log from a financial institution computer of one or more financial institution of an electronic transaction to the processor, the financial institution computer having an operatively associated database, the periodic transaction log containing at least one transaction datum for at least one transaction;

receiving, by way of the processor of the computer system, one or more payment card data associated with each financial account, wherein each payment card data is operatively associated with a particular financial account of the one or more financial accounts to effectuate at least one electronic transaction;

registering, by way of the processor, each payment card data with the systemic software;

manually holding a plurality of physical receipts in front of the image capture device;

capturing, by way of the image capture device, an image of the plurality of physical receipts associated with the one or more payment card data, wherein the systemic software is configured to recognize and retrievably store a receipt sales tax portion of each physical receipt in the operatively associated database;

the systemic software configured to identify and abstract transactional data from each electronic transaction, wherein the transactional data includes an electronic sales tax portion determined based on a physical location associated with each transactional datum in the periodic transaction log;

authenticating, by way of the processor, the electronic sales tax portion identified by the systemic software and the payment card data registered with the systemic software; and generating a report totaling and itemizing the electronic sales tax portions and the receipt sales tax portions, whereby manual calculations by a user is eliminated.

2. The method of claim 1, wherein the systemic software retrievably stores each electronic sales tax portion in the operatively associated database, and wherein the systemic software is configured to retrieve one or more reports of each electronic sales tax portion as a function of time.

3. The method of claim 2, wherein each report is organizable in a daily report, weekly, a monthly report, or a yearly report.

4. The method of claim 3, wherein the transactional data further includes a purchase price associated with a merchant name and a total purchase price, wherein the systemic software retrievably stores each total purchase price in the operatively associated database, and wherein the systemic software is configured to retrieve one or more reports of each electronic sales tax portion as a function of time.

5. The method of claim 1, wherein the plurality of physical receipts are cash receipts.

\* \* \* \* \*